US010416658B2

(12) United States Patent
Hashimoto (10) Patent No.: US 10,416,658 B2
(45) Date of Patent: Sep. 17, 2019

(54) OPERATION MANAGEMENT SYSTEM

(71) Applicant: FANUC Corporation, Yamanashi (JP)

(72) Inventor: Arito Hashimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 221 days.

(21) Appl. No.: 15/185,021

(22) Filed: Jun. 17, 2016

(65) Prior Publication Data

US 2016/0370787 A1    Dec. 22, 2016

(30) Foreign Application Priority Data

Jun. 19, 2015  (JP) ................................ 2015-123778

(51) Int. Cl.
*H04L 12/28* (2006.01)
*G01R 31/08* (2006.01)
*G05B 21/00* (2006.01)
*G05D 23/00* (2006.01)
*G05B 19/418* (2006.01)

(52) U.S. Cl.
CPC .......... *G05B 19/4183* (2013.01); *Y02P 90/10* (2015.11); *Y02P 90/20* (2015.11)

(58) Field of Classification Search
CPC ............. H04L 12/2803; H04L 12/2809; H04L 12/282
See application file for complete search history.

(56) References Cited

U.S. PATENT DOCUMENTS

| 7,221,991 | B2* | 5/2007 | Matsushita | ........ G01R 31/2894 |
| | | | | 700/110 |
| 7,457,262 | B1* | 11/2008 | Doshi | .................. H04W 24/04 |
| | | | | 370/328 |
| 9,800,428 | B2* | 10/2017 | Sasaki | ................. H04L 12/2803 |

(Continued)

FOREIGN PATENT DOCUMENTS

| JP | 2003-346024 A | 12/2003 |
| JP | 2004-272414 A | 9/2004 |

(Continued)

OTHER PUBLICATIONS

Office Action in JP Application No. 2015-123778, dated Jun. 27, 2017, 8pp.

(Continued)

*Primary Examiner* — Abdelmoniem I Elamin
(74) *Attorney, Agent, or Firm* — Hauptman Ham, LLP (57) ABSTRACT

An operation management system according to the present invention stores manufacture facility information in which identification information capable of uniquely specifying a manufacture facility is associated with position information of the manufacture facility in a manufacture facility information storage unit, a management device acquires the manufacture facility information from the manufacture facility information storage unit, arranges the manufacture facility on an arrangement map based on the manufacture facility information, and conducts communication setting for acquiring operation information, and the management (Continued)

device acquires the operation information of the manufacture facility via communication based on the communication setting, and displays the acquired operation information on the arrangement map.

4 Claims, 10 Drawing Sheets

(56) References Cited

U.S. PATENT DOCUMENTS

| | | | | |
|---|---|---|---|---|
| 2003/0163250 | A1* | 8/2003 | Nakagawa | G01C 21/36 |
| | | | | 701/431 |
| 2004/0083210 | A1* | 4/2004 | Ochiai | G06F 17/30241 |
| 2005/0071124 | A1 | 3/2005 | Komatsu | |
| 2007/0090953 | A1* | 4/2007 | Park | G05B 19/4183 |
| | | | | 340/572.1 |
| 2008/0309464 | A1* | 12/2008 | Chihara | H04W 4/02 |
| | | | | 340/10.42 |
| 2011/0115816 | A1* | 5/2011 | Brackney | G06Q 10/06 |
| | | | | 345/629 |
| 2014/0156186 | A1* | 6/2014 | Liu | G01C 21/206 |
| | | | | 701/533 |
| 2015/0201167 | A1* | 7/2015 | Yamaji | G05B 19/042 |
| | | | | 348/86 |
| 2016/0110984 | A1* | 4/2016 | Seol | G08B 21/02 |
| | | | | 340/539.13 |
| 2016/0305679 | A1* | 10/2016 | Noguchi | F24F 11/30 |
| 2017/0115648 | A1* | 4/2017 | Nixon | G06F 17/30312 |

FOREIGN PATENT DOCUMENTS

| | | |
|---|---|---|
| JP | 2005-107671 A | 4/2005 |
| JP | 2007-334736 A | 12/2007 |
| JP | 2009-3872 A | 1/2009 |
| JP | 2009-265719 A | 11/2009 |
| JP | 2014-164598 A | 9/2014 |

OTHER PUBLICATIONS

Office Action in JP Application No. 2015-123778, dated Dec. 4, 2018, 19pp.

* cited by examiner

FIG.8A (a) MANUFACTURE FACILITY IDENTIFICATION INFORMATION 11 22 33 44 55 66

FIG.8B (b) MANUFACTURE FACILITY POSITION INFORMATION

OPERATION MANAGEMENT SYSTEM

RELATED APPLICATIONS

The present application claims priority to Japanese Patent Application Number 2015-123778, filed Jun. 19, 2015, the disclosure of which is hereby incorporated by reference herein in its entirety.

BACKGROUND OF THE INVENTION

1. Field of the Invention

The present invention relates to an operation management system.

2. Description of the Related Art

In a factory where a plurality of manufacture facilities (such as machine tools, robots, or industrial machines) operate, there is known an operation management system in which a controller for controlling each manufacture facility (such as numerical controller, robot controller or programmable logic controller) and a management device for collecting and monitoring data on an operation situation of each manufacture facility are connected to each other via a network line (such as LAN or Internet) thereby to intensively manage the operation situations of the manufacture facilities (see JP 2004-272414 A, for example).

The management device in the operation management system may create a map in which the manufacture facilities to be managed are arranged, and may display a state of each manufacture facility on the arrangement map. In order to do this, the management device needs to manually associate the arrangement of each manufacture facility based on the actual arrangement map of each manufacture facility with communication setting between the management device and the controller of each manufacture facility.

In creating the manufacture facility arrangement map in the management device in the operation management system, however, when a user manually associates the arrangement of each manufacture facility with the communication setting between the management device and the controller of each manufacture facility, the user needs to go the rounds of the factory with the arrangement map, to visually confirm the information on the controller of each manufacture facility or the communication setting, to record it in a sheet or a potable terminal, and further to manually input it into the management device, and thus there is a problem that an increase in manufacture facilities causes an increase in user's load and an increase in erroneous input.

SUMMARY OF THE INVENTION

It is therefore an object of the present invention to provide an operation management system capable of easily and accurately creating a manufacture facility arrangement map in which manufacture facilities and their identification information are arranged.

According to the present invention, in creating the manufacture facility arrangement map in the management device in the operation management system, the arrangement of each manufacture facility is automatically associated with the communication setting between the management device and the controller of each manufacture facility.

An operation management system according to the present invention is an operation management system including a management device that arranges and displays operation information of at least one manufacture facility including a controller on an arrangement map indicating an outline of a plant where the manufacture facility is installed, and the includes: a manufacture facility information storage unit that stores manufacture facility information in which identification information capable of uniquely specifying the manufacture facility is associated with position information capable of specifying a position of the manufacture facility, wherein the management device includes: a manufacture facility information acquisition unit that acquires the manufacture facility information from the manufacture facility information storage unit; an arrangement map creation unit that sets coordinate information of the manufacture facility on the arrangement map based on the position information included in the manufacture facility information, and sets communication setting information required for communication with the controller based on the identification information included in the manufacture facility information; an operation information acquisition unit that acquires the operation information of the manufacture facility by making communication with the controller by use of the communication setting information set by the arrangement map creation unit; and an operation information display unit that displays the operation information of the manufacture facility acquired by the operation information acquisition unit on the arrangement map based on the coordinate information.

The operation management system according to the present invention, further includes a terminal device, wherein the manufacture facility information storage unit is provided in the terminal device, the controller includes an identification information output unit that outputs identification information capable of uniquely specifying the manufacture facility near the controller, the terminal device includes: an identification information acquisition unit that acquires the identification information output by the identification information output unit; and a position information acquisition unit that acquires position information of the terminal device when the identification information is acquired, and the terminal device associates the identification information with the position information, and stores the identification information and the position information in the manufacture facility information storage unit.

The manufacture facility information storage unit is provided in the controller, the controller further includes: an identification information storage unit that stores identification information capable of uniquely specifying the manufacture facility; and a position information acquisition unit that acquires position information of the controller, and the controller associates the identification information with the position information, and stores the identification information and the position information in the manufacture facility information storage unit.

According to the present invention, it is possible to easily and accurately make an arrangement of each manufacture facility and conduct communication setting between the management device and the controller of each manufacture facility in creating the manufacture facility arrangement map in the management device in the operation management system.

BRIEF DESCRIPTION OF THE DRAWINGS

The above and other objects and characteristics of the present invention will be more apparent from the following description of the embodiments with reference to the accompanying drawings in which.

DETAILED DESCRIPTION OF THE PREFERRED EMBODIMENTS

Embodiments of the present invention will be described below with reference to the drawings.

According to a first embodiment (FIG. 1) of the present invention, identification information is previously set in a controller for controlling each manufacture facility, and a terminal device including a technical structure of acquiring the identification information and a technical structure of specifying an indoor position is used so that the identification number of the controller is acquired by the terminal device to be the identification information of the controller, and position information of the acquisition place is acquired at the same time to be the position information of the controller. The manufacture facility may be any device such as machine tool, robot, or industrial machine, which is installed in a plant such as factory and is to be managed.

As the method for acquiring the identification information of the controller, for example, a display means may be provided for the controller to display the identification information at an externally-observable position, and the displayed identification information may be acquired by an image recognition means provided in the terminal device. In this case, the display means provided in the controller may be segment display, liquid crystal display, electronic paper, or the like, or may only attach a printed material. The identification information may be displayed in characters as it is, or may be displayed by use of barcode, 2D code, or the like.

As another method for acquiring the identification information of the controller, there may be configured such that the controller is provided with a wired connection adapter for simple connection (such as USB cable or cradle), a near distance wireless communication means such as infrared communication, NFC, or Bluetooth (registered trademark), or a wireless IC tag so that the terminal device can acquire the identification information in a wired or wireless manner, or any structure in which a worker can easily acquire the identification information of the controller by use of the terminal device near the manufacture facility may be employed.

Thereafter, data in a pair of position information and identification information of the controller acquired by the terminal device is fetched into the management device, a manufacture facility arrangement map is created based on the position information of the controller in the fetched data, and the communication setting with the controller of each manufacture facility on the arrangement map is conducted based on the identification information of the controller, thereby creating the manufacture facility arrangement map in which the arrangement of each manufacture facility is associated with the communication setting between the management device and the controller of each manufacture facility.

According to a second embodiment (FIG. 9) of the present invention, the technical structure of specifying an indoor position is mounted on the controller for controlling the manufacture facility, and each controller acquires its position information by use of the technical structure, and transmits the data in a pair of position information and identification information to the management device or makes a replay in response to a request from the management device via the communication means.

Figure 9:
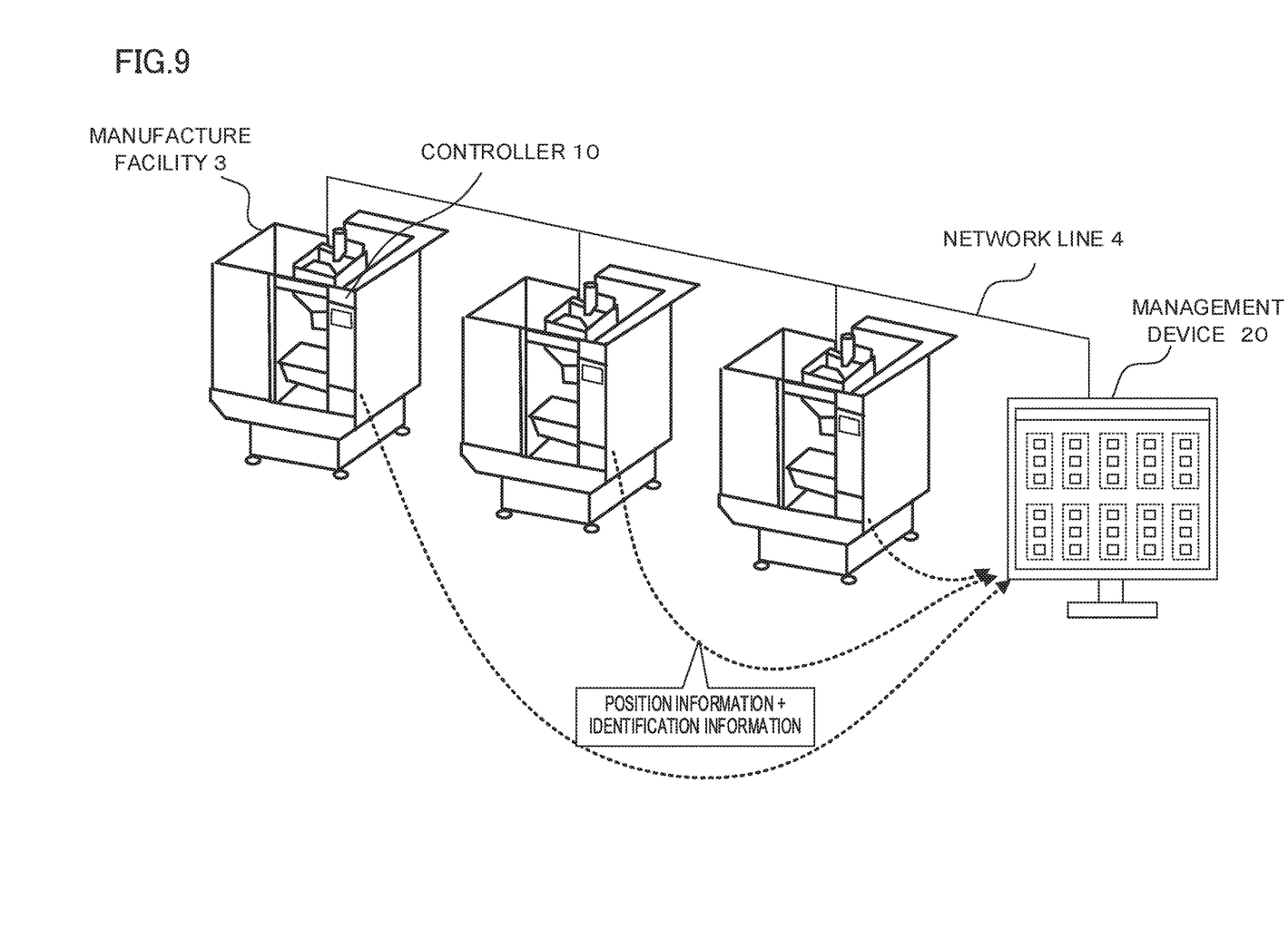
FIG. 9 is a configuration diagram of an operation management system according to a second embodiment of the present invention.

The management device creates a manufacture facility arrangement map based on the position information of the controller in the data acquired from each controller, and conducts the communication setting with the controller of each manufacture facility on the arrangement map based on the identification information, thereby creating the manufacture facility arrangement map in which the arrangement of each manufacture facility is associated with the communication setting between the management device and the controller of each manufacture facility.

First Embodiment

The following description of the present embodiment will be made based on an exemplary structure in which a controller is provided with a display means thereby to display identification information.

Figure 1:
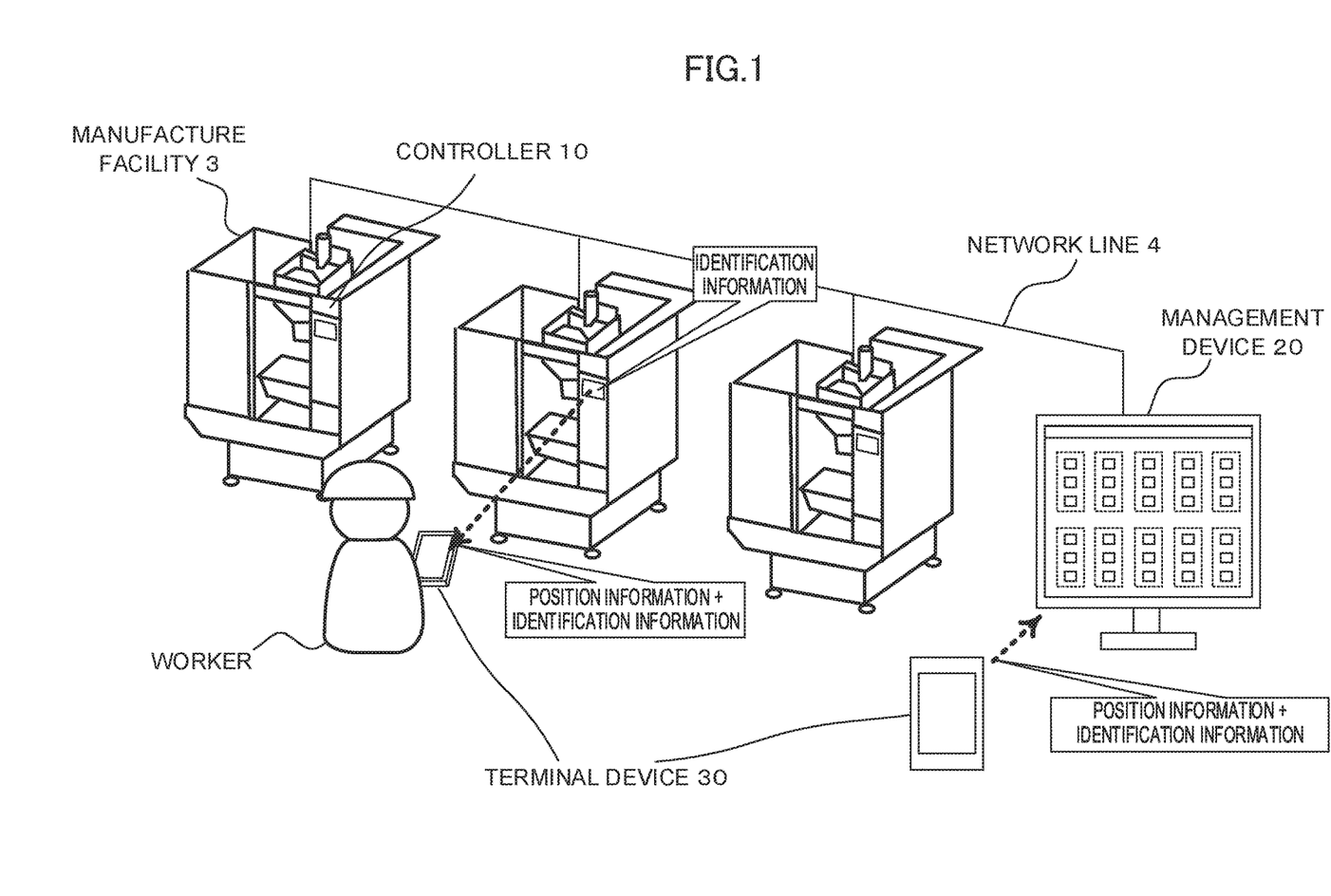
FIG. 1 is a configuration diagram of an operation management system according to a first embodiment of the present invention.

FIG. 1 is a configuration diagram of an operation management system according to the present embodiment. The present embodiment is an operation management system configured of controllers 10, a management device 20, and a terminal device 30, which are connected to a network line 4 (such as LAN or Internet). The terminal device 30 does not necessarily need to be connected to the network line 4. A manufacture facility 3 is controlled by the controller 10.

Figure 2:
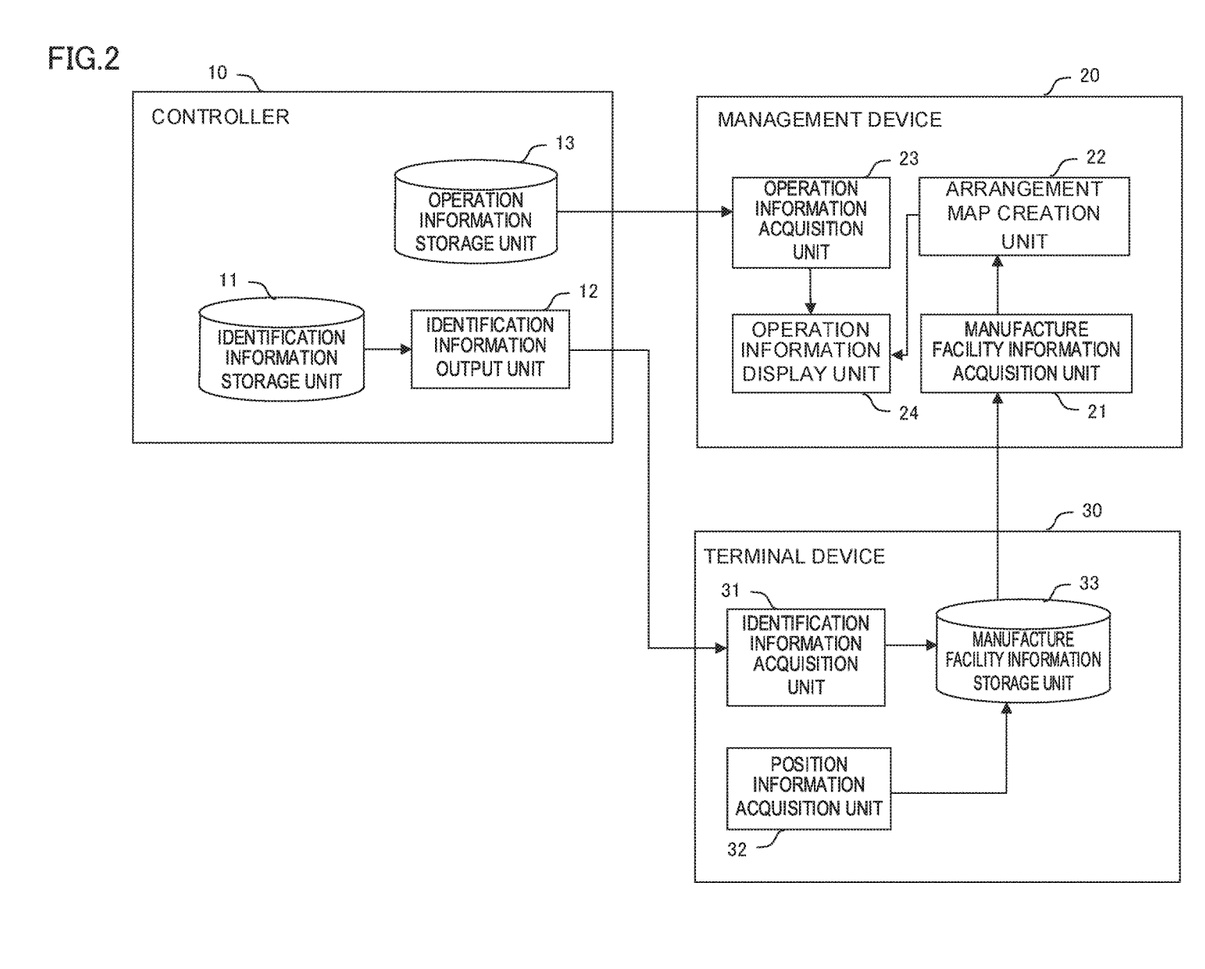
FIG. 2 is a functional block diagram of the operation management system according to the first embodiment of the present invention.

FIG. 2 is a functional block diagram of the operation management system according to the present embodiment. The controller 10 includes an identification information storage unit 11 for storing identification information of the manufacture facility 3, an identification information output unit 12 for displaying the identification information, and an operation information storage unit 13 for storing operation information of the manufacture facility 3.

The management device 20 includes a manufacture facility information acquisition unit 21 for acquiring identification information and position information of the manufacture facilities 3 from the terminal device 30, an arrangement map creation unit 22 for creating an arrangement map of the manufacture facilities 3 based on the identification information and the position information of the manufacture facilities 3, an operation information acquisition unit 23 for acquiring the operation information of the manufacture facilities from the controllers of the manufacture facilities 3, and an operation information display unit 24 for displaying the operation information of each manufacture facility on the manufacture facility arrangement map.

The terminal device 30 includes an identification information acquisition unit 31 for acquiring the identification information of the manufacture facilities by an image recognition technique, a position information acquisition unit 32 for acquiring position information where the identification information is acquired by an indoor positioning technique, and a manufacture facility information storage unit 33 for storing the position information and the identification information of the manufacture facilities.

A procedure of creating the manufacture facility arrangement map will be described below with reference to the flowcharts of FIG. 3 to FIG. 6.

Figure 3:
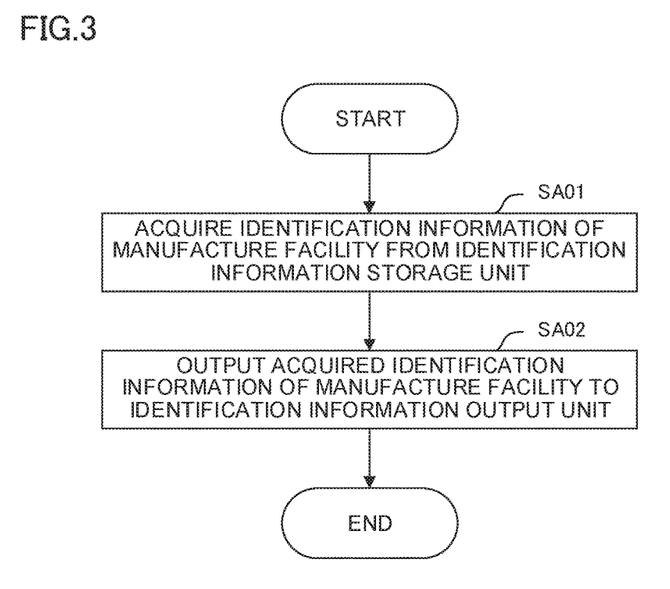
FIG. 3 is a flowchart of the processings performed in a controller according to the first embodiment of the present invention.

FIG. 3 is a flowchart of the processings performed in the controller 10 according to the present embodiment.

Figure 8A:
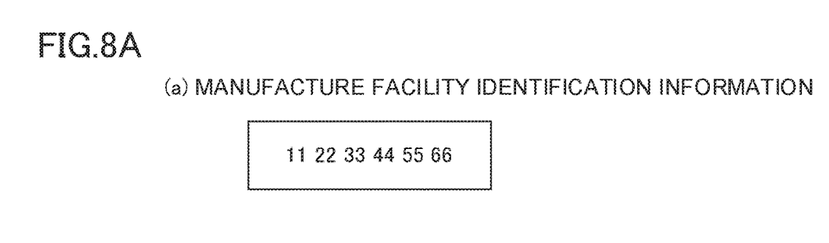
FIG. 8A is a diagram illustrating identification information of a manufacture facility according to the present invention.

[Step SA01] The controller 10 acquires identification information of the manufacture facility 3 from the identification information storage unit 11 for storing the identification information of the manufacture facility 3. The identification information of the manufacture facility 3 may employ any information by which the management device 20 can uniquely identify the manufacture facility 3, and may employ the MAC address used for communication by the controller 10 for controlling the manufacture facility 3, for example (FIG. 8A).

[Step SA02] The identification information of the manufacture facility acquired in step SA01 is output and displayed by the identification information output unit 12. The display contents may be displayed in an identification number as described above, or may be displayed in the form of barcode. Further, an operation unit may be provided near the display device and the operation unit may be operated thereby to switch different display forms.

Figure 4:
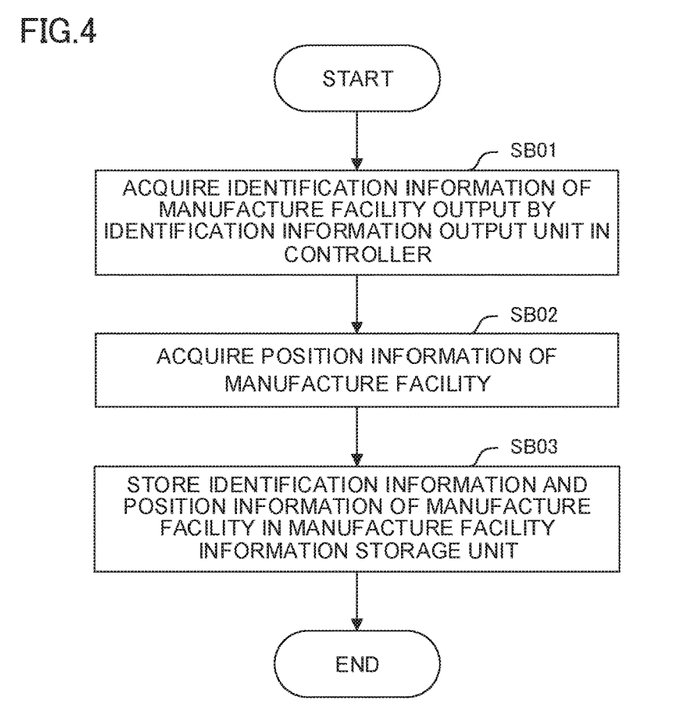
FIG. 4 is a flowchart of the processings performed in a terminal device according to the first embodiment of the present invention.

FIG. 4 is a flowchart of the processings performed in the terminal device 30 according to the present embodiment

[Step SB01] The identification information acquisition unit 31 in the terminal device 30 acquires an image of the identification information of the manufacture facility output and displayed by the identification information output unit 12 in the controller 10, and extracts the identification information part from the image by use of OCR (optical character recognition), thereby acquiring the identification information.

Figure 8B:
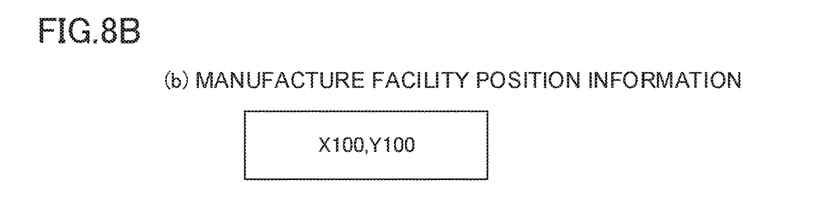
FIG. 8B is a diagram illustrating position information of a manufacture facility according to the present invention.

[Step SB02] The position information acquisition unit 32 in the terminal device 30 acquires position information on where the identification information is acquired (FIG. 8B). The means for acquiring an indoor position may employ any technical means capable of specifying an indoor position at a certain accuracy, may employ a Wi-Fi (registered trademark) positioning technique, for example, or may employ a technique using beacons arranged at positions, or a geomagnetic positioning technique or the like.

[Step SB03] The acquired identification information and position information of the manufacture facility are stored in the manufacture facility information storage unit 33.

Figure 5:
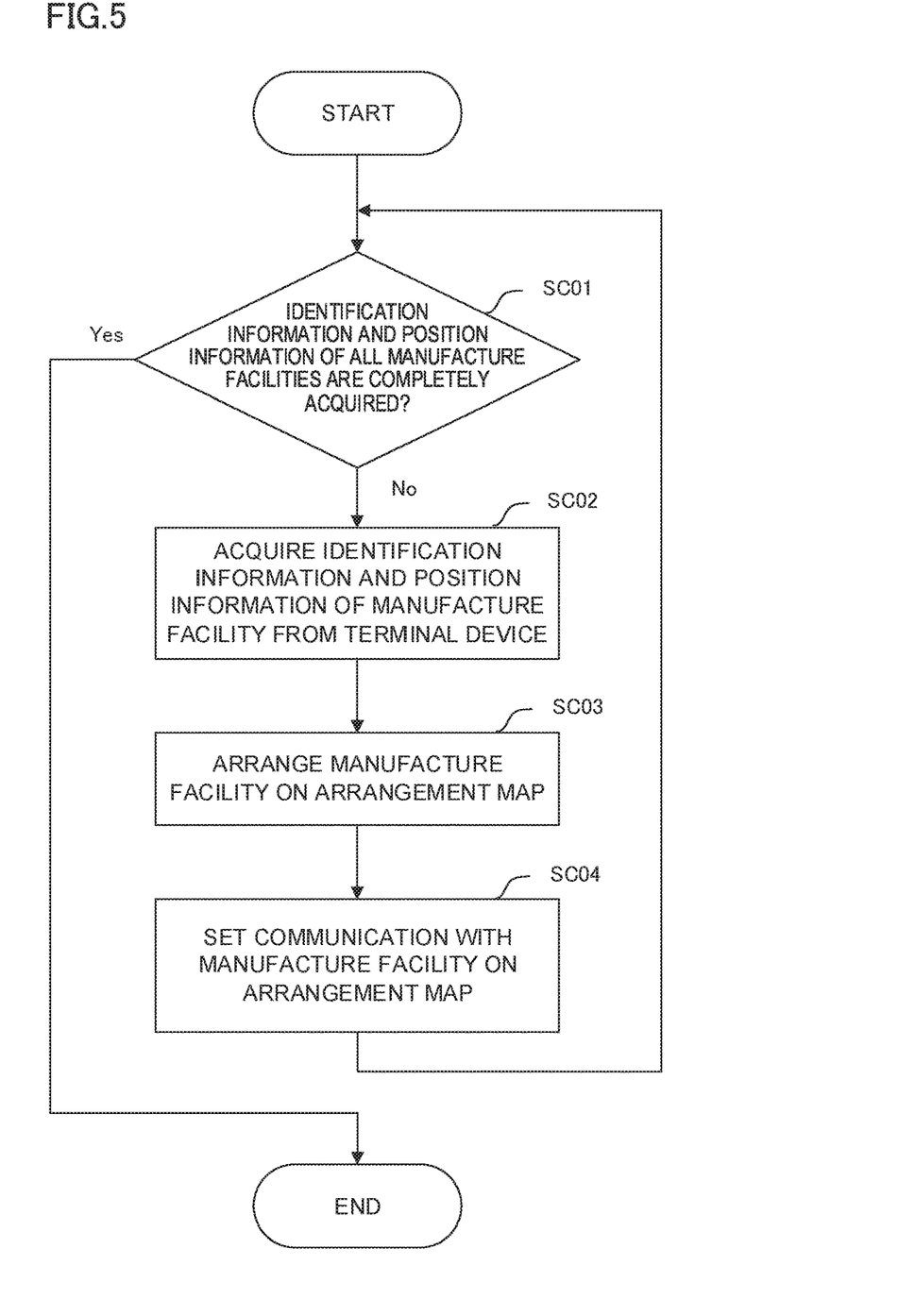
FIG. 5 is a flowchart of the processings of arranging a manufacture facility on an arrangement map performed in the management device according to the first embodiment of the present invention.

FIG. 5 is a flowchart of the processings performed by the manufacture facility information acquisition unit 21 and the arrangement map creation unit 22 in the management device 20 according to the present embodiment.

[Step SC01] A determination is made as to whether the identification information and the position information of all the manufacture facilities 3 are completely acquired. When the information of all the manufacture facilities 3 is completely acquired, the processing is terminated, and when it is not completely acquired, the processing proceeds to step SC02.

[Step SC02] The manufacture facility information acquisition unit 21 in the management device 20 sequentially acquires the identification information and the position information of the manufacture facilities 3 stored in the manufacture facility information storage unit 33 in the terminal device 30. The management device 20 and the terminal device 30 may acquire the identification information and the position information of the manufacture facilities 3 via a communication line in wireless communication such as Wi-Fi (registered trademark) or wired communication such as USB cable, or may acquire the same by use of other means such as memory card.

Figure 7:
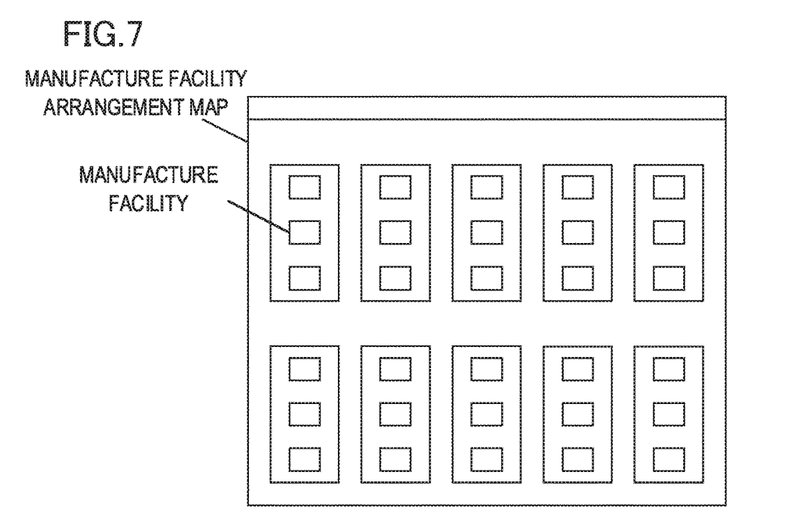
FIG. 7 is a diagram illustrating an exemplary arrangement map according to the present invention.

[Step SC03] The arrangement map creation unit 22 in the management device 20 determines the coordinate positions on the arrangement map for displaying the information of the manufacture facilities 3 based on the acquired position information of the manufacture facilities 3, and arranges the manufacture facilities at the coordinate positions determined on the arrangement map illustrated in FIG. 7. The arrangement map is managed together with the data capable of grasping a correspondence between the coordinate values on the arrangement map and the positions of the facilities, and the arrangement map creation unit 22 calculates the coordinate positions on the arrangement map based on the position information of the manufacture facilities 3 by use of the data.

[Step SC04] The arrangement map creation unit 22 in the management device 20 conducts the communication setting required for making communication with the manufacture facilities arranged on the arrangement map based on the acquired identification information of the manufacture facilities 3 via the network line 4. When the MAC addresses are used for the identification information, the MAC addresses and the IP addresses can be associated with each other by use of DHCP (Dynamic Host Configuration Protocol), thereby setting the IP address for making communication with each manufacture facility on the arrangement map. The method for conducting the communication setting based on the identification information is not limited thereto.

The processings of displaying the operation information of each manufacture facility 3 based on the created manufacture facility arrangement map will be described below.

Figure 6:
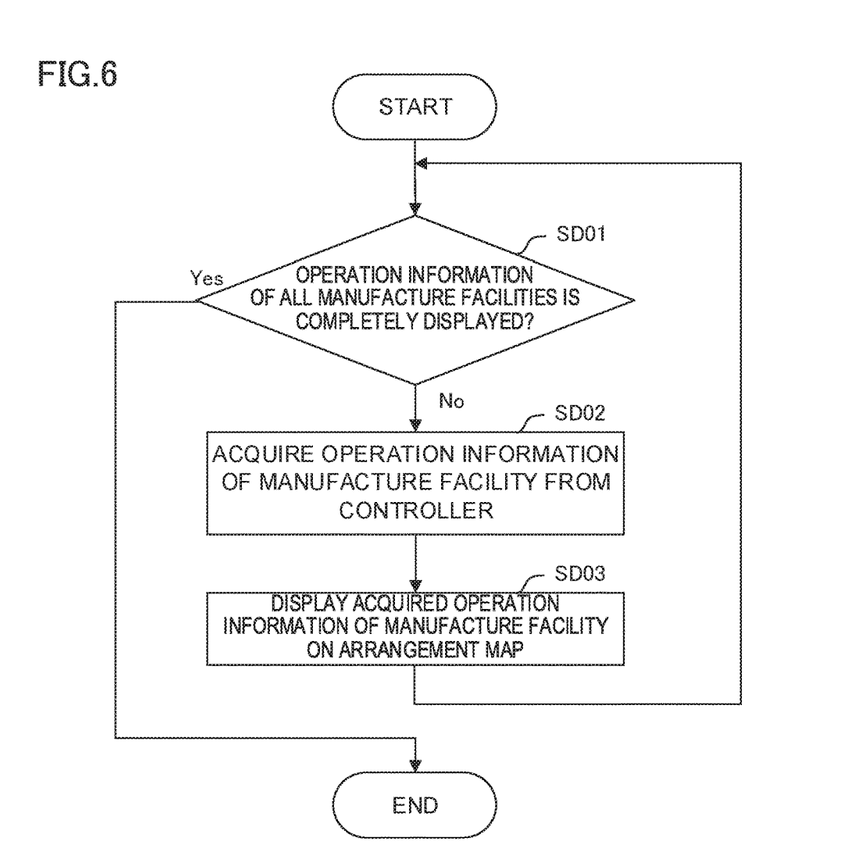
FIG. 6 is a flowchart of the processings of displaying operation information of a manufacture facility performed in the management device according to the first embodiment of the present invention.

FIG. 6 is a flowchart of the processings performed by the operation information acquisition unit 23 and the operation information display unit 24 in the management device 20 according to the present embodiment.

[Step SD01] A determination is made as to whether the operation information of all the manufacture facilities 3 is completely displayed. When the operation information of all the manufacture facilities 3 is completely displayed, the processing is terminated, and when it is not completely displayed, the processing proceeds to step SD02.

[Step SD02] The operation information acquisition unit 23 in the management device 20 acquires the operation information of the manufacture facility 3 from the operation information storage unit 13 in the controller 10 via the network line 4. The communication between the management device 20 and the controller 10 is made based on the communication setting conducted in step SC03. The operation information includes a startup state, an operation situation such as being idle or in operation, alarm information, and the like of the manufacture facility 3.

[Step SD03] The operation information display unit 24 in the management device 20 displays the acquired operation information of the manufacture facilities 3 on the manufacture facility arrangement map (FIG. 7).

In this way, with the operation management system according to the present invention, a worker goes the rounds of the manufacture facilities with the terminal device thereby to semi-automatically acquire the identification information and the position information of the respective manufacture facilities in a simple operation, thereby easily and accurately making the arrangement of the manufacture facilities and conducting the communication setting between the management device and the controller of each manufacture facility.

Second Embodiment

FIG. 9 is a configuration diagram of the operation management system according to the second embodiment. The present embodiment is an operation management system configured of the controllers 10 and the management device 20, which are connected to the network line 4 (such as LAN or Internet).

Figure 10:
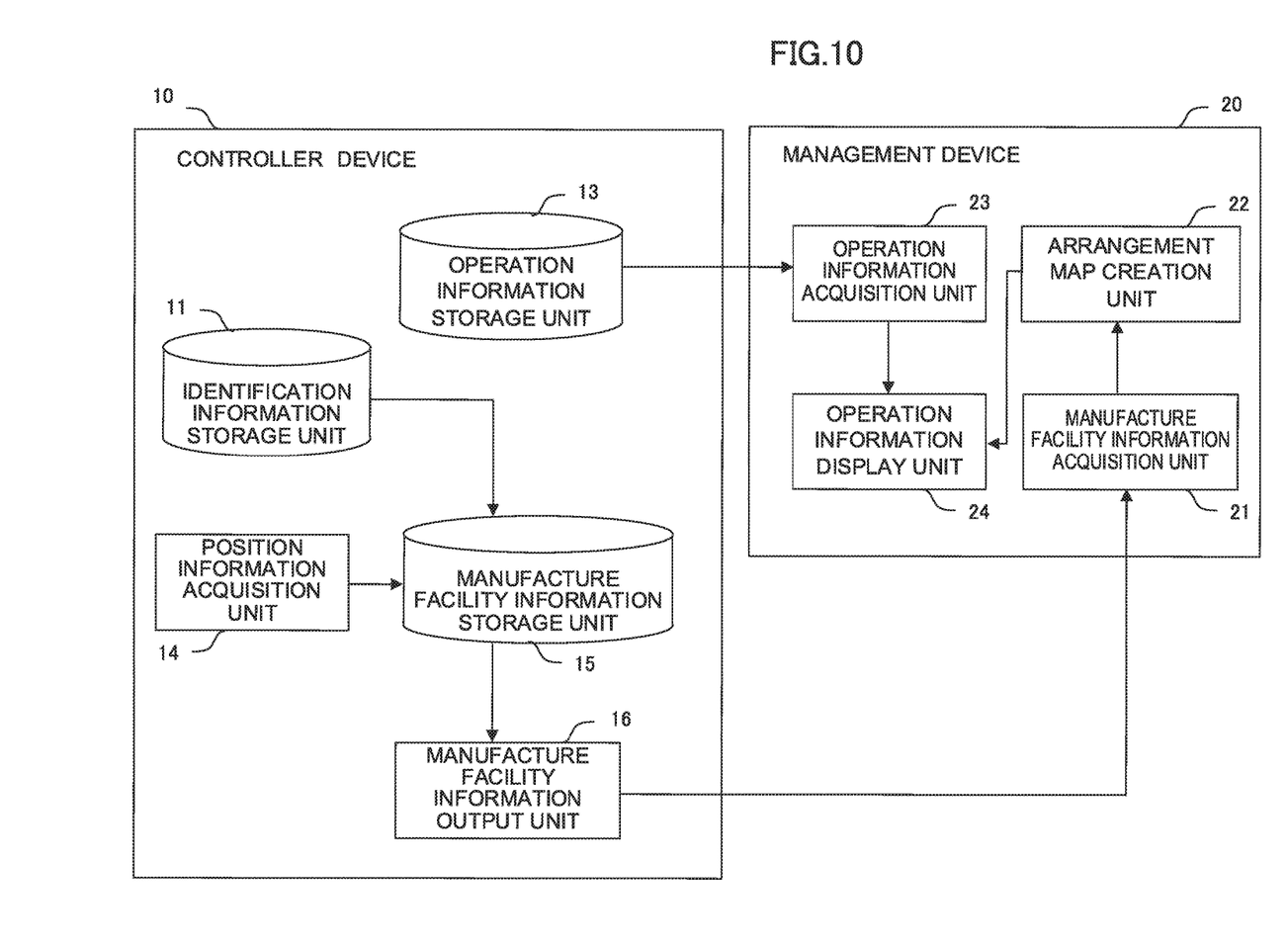
FIG. 10 is a functional block diagram of the operation management system according to the second embodiment of the present invention.

FIG. 10 is a functional block diagram of the operation management system according to the present embodiment. The controller 10 according to the present embodiment includes the identification information storage unit 11 for storing the identification information of the manufacture facility 3, the operation information storage unit 13 for storing the operation information of the manufacture facility 3, a position information acquisition unit 14 for acquiring the position information by an indoor positioning technique, a manufacture facility information storage unit 15 for storing the position information and the identification information of the manufacture facility 3, and a manufacture facility information output unit 16 for outputting the manufacture facility information stored in the manufacture facility information storage unit 15 in a different way (such as temporary Wi-Fi (registered trademark) communication) from the network line 4.

Further, the management device 20 according to the present embodiment includes the manufacture facility information acquisition unit 21 for acquiring the identification information and the position information of the manufacture facilities 3 from the controllers 10, the arrangement map creation unit 22 for creating an arrangement map of the manufacture facilities 3 based on the identification information and the position information of the manufacture facilities 3, the operation information acquisition unit 23 for acquiring the operation information of the manufacture facilities 3 from the controllers of the manufacture facilities 3, and the operation information display unit 24 for displaying the operation information of the manufacture facilities 3 on the manufacture facility arrangement map.

A procedure of creating the arrangement map of the manufacture facilities 3 in the operation management system according to the present embodiment will be described below with reference to the flowcharts of FIG. 11 to FIG. 13.

Figure 11:
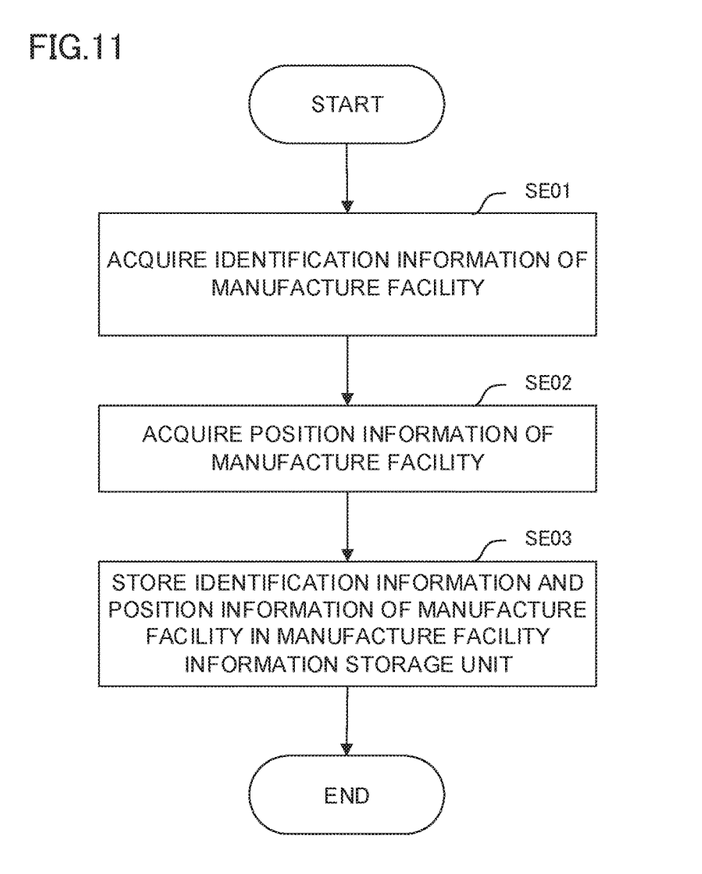
FIG. 11 is a flowchart of the processings performed in the controller according to the second embodiment of the present invention.

FIG. 11 is a flowchart of the processings performed in the controller 10 according to the present embodiment.

[Step SE01] The controller 10 acquires the identification information of the manufacture facility 3 from the identification information storage unit 11 for storing the identification information of the manufacture facility 3.

[Step SE02] The position information acquisition unit 14 acquires the position information of the manufacture facility 3. The means for acquiring an indoor position may employ any technical means capable of specifying an indoor position at a certain accuracy, may employ a Wi-Fi (registered trademark) positioning technique, for example, or may employ a technique using beacons arranged at positions, or a geomagnetic positioning technique or the like.

[Step SE03] The acquired identification information and position information of the manufacture facility 3 are stored in the manufacture facility information storage unit 15.

Figure 12:
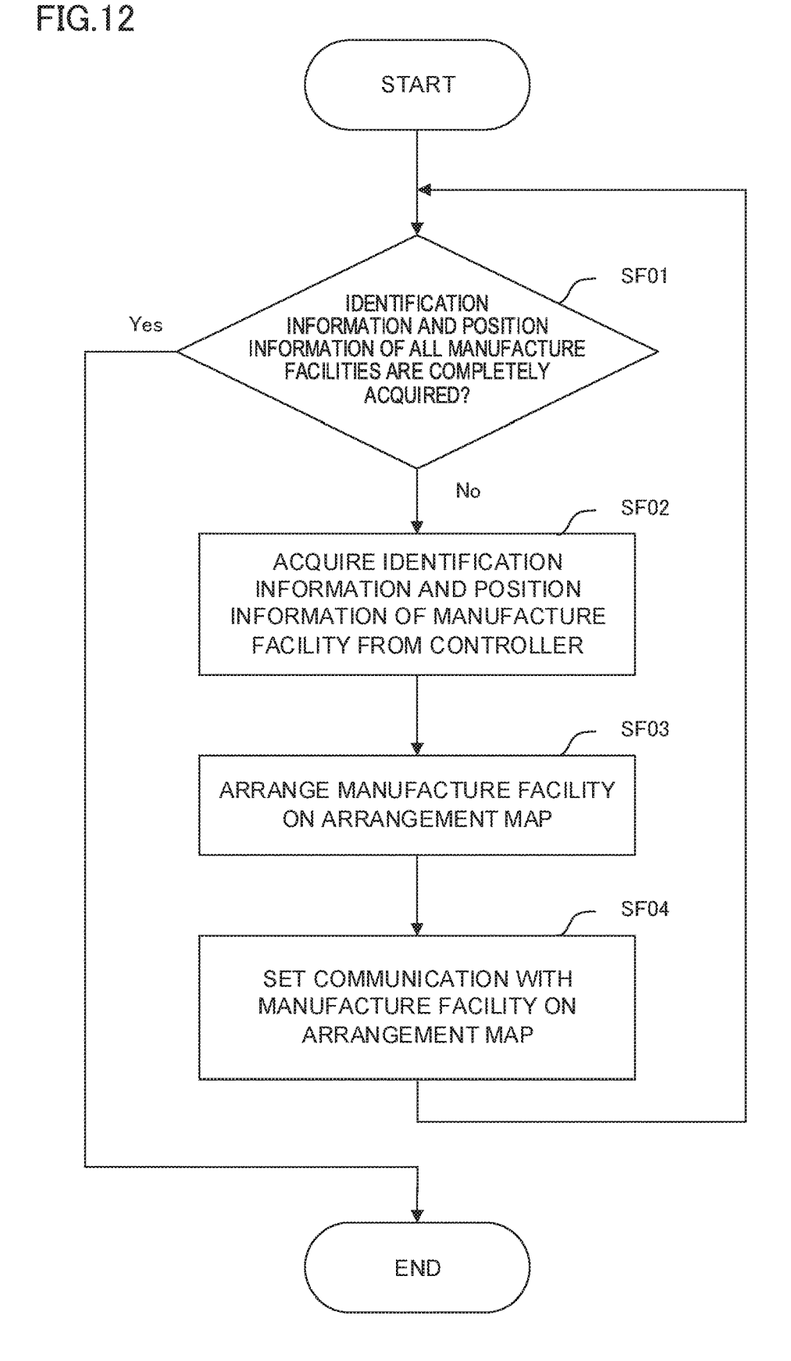
FIG. 12 is a flowchart of the processings of arranging a manufacture facility on an arrangement map performed in the management device according to the second embodiment of the present invention.

FIG. 12 is a flowchart of the processings performed by the manufacture facility information acquisition unit 21 and the arrangement map creation unit 22 in the management device 20 according to the present embodiment.

[Step SF01] A determination is made as to whether the identification information and the position information of all the manufacture facilities 3 are completely acquired. When the information of all the manufacture facilities 3 is completely acquired, the processing is terminated, and when it is not completely acquired, the processing proceeds to step SF02.

[Step SF02] The manufacture facility information acquisition unit 21 in the management device 20 sequentially acquires the identification information and the position information of the manufacture facility 3 stored in the manufacture facility information storage unit 15 in the controller 10. The identification information and the position information, which are output by the manufacture facility information output unit 16, are acquired. As the output method, the controllers 10 may make a notification to the management device 20 at the same time via temporary Wi-Fi (registered trademark) communication, for example, or the management device 20 may make a request to acquire and the controller 10 may respond it thereby to output the information from the manufacture facility information output unit 16. The acquisition method is not limited thereto.

[Step SF03] The arrangement map creation unit 22 in the management device 20 determines the coordinate positions on the arrangement map for displaying the information of the manufacture facilities 3 based on the acquired position information of the manufacture facilities 3, and arranges the manufacture facilities at the coordinate positions determined on the arrangement map illustrated in FIG. 7. The arrangement map is managed together with the data capable of grasping a correspondence between the coordinate values on the arrangement map and the positions of the facilities, and the arrangement map creation unit 22 calculates the coordinate positions on the arrangement map based on the position information of the manufacture facilities 3 by use of the data.

[Step SF04] The arrangement map creation unit 22 in the management device 20 conducts the communication setting required for making communication with the manufacture facilities arranged on the arrangement map based on the acquired identification information of the manufacture facilities 3 via the network line 4. The method for conducting the communication setting based on the identification information is the same as in the first embodiment, but is not limited thereto.

The processings of displaying the operation information of each manufacture facility based on the created manufacture facility arrangement map will be described below.

Figure 13:
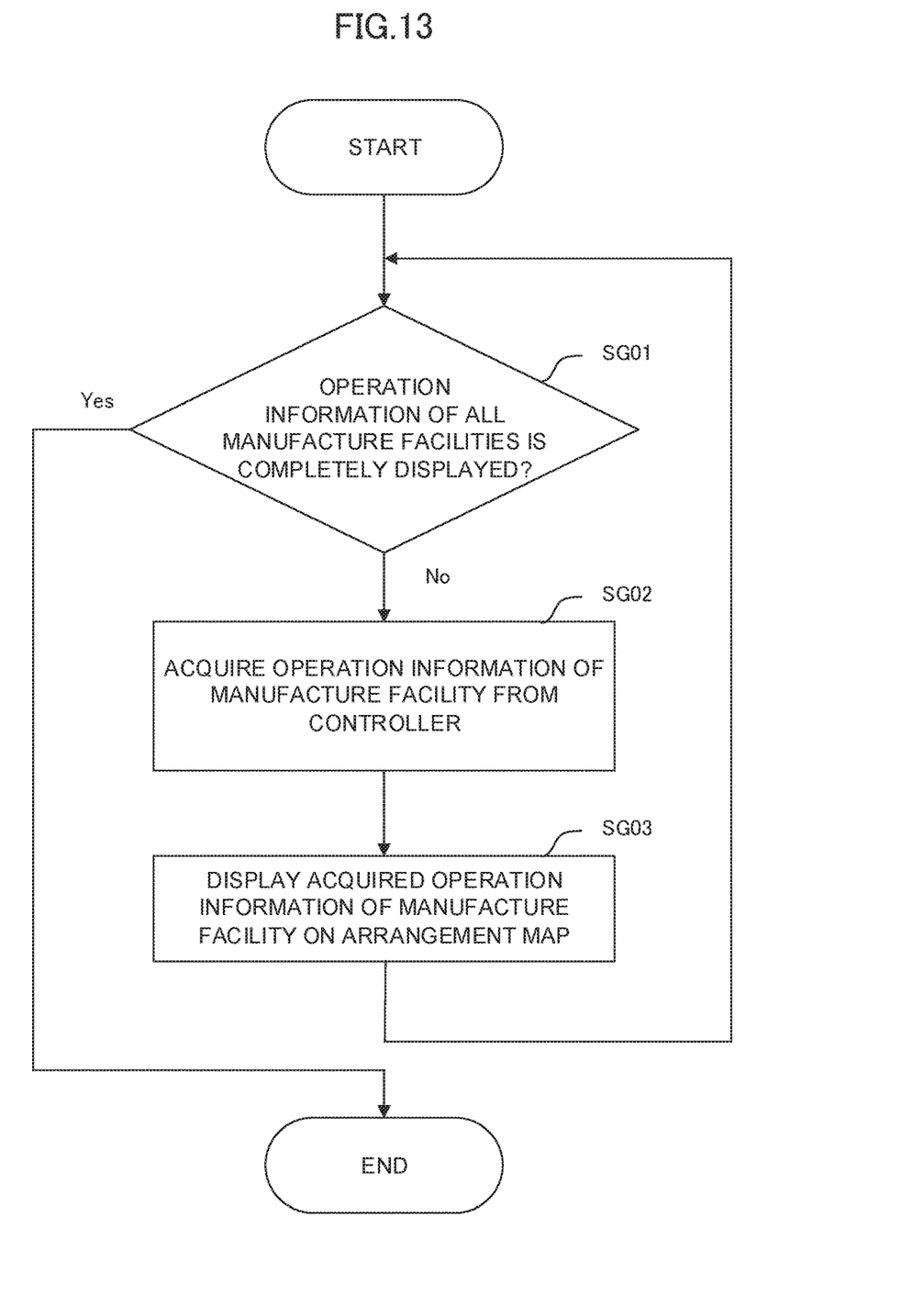
FIG. 13 is a flowchart of the processings of displaying operation information of a manufacture facility performed in the management device according to the second embodiment of the present invention.

FIG. 13 is a flowchart of the processings performed by the operation information acquisition unit 23 and the operation information display unit 24 in the management device 20 according to the present embodiment.

[Step SG01] A determination is made as to whether the operation information of all the manufacture facilities 3 is completely displayed. When the operation information of all the manufacture facilities 3 is completely displayed, the processing is terminated, and when it is not completely displayed, the processing proceeds to step SG02.

[Step SG02] The operation information acquisition unit 23 in the management device 20 acquires the operation information of the manufacture facility 3 from the operation information storage unit 13 in the controller 10 via the network line 4. The communication between the management device 20 and the controller 10 is made based on the communication setting information set in step SF03. The operation information includes a startup state, an operation situation such as being idle or in operation, alarm information, and the like of the manufacture facility 3.

[Step SG03] The operation information display unit 24 in the management device 20 displays the acquired operation information of the manufacture facilities 3 on the manufacture facility arrangement map (FIG. 7).

The embodiments of the present invention have been described above, but the present invention is not limited to the embodiments described above, and may be changed as needed to be accomplished in various forms.

The first embodiment is described assuming that the controller 10 displays and outputs the identification information stored in the identification information storage unit 11 by the identification information output unit 12 as display means, but the identification information output unit 12 for printed material may be provided for printed material display, and the identification information storage unit 11 for display and output of the identification information output unit 12 does not need to be provided.

The invention claimed is:

1. An operation management system, comprising:
at least one manufacture facility, which includes one of a machine tool, a robot and an industrial machine, the manufacture facility comprising a controller;
a management device including a display and a first processor, the first processor being configured to arrange and cause the display to display operation information of the at least one manufacture facility on an arrangement map indicating an outline of a plant where the manufacture facility is installed; and
a first memory configured to store manufacture facility information in which identification information uniquely specifying the manufacture facility is associated with position information specifying a position of the manufacture facility,
wherein the first processor of the management device is further configured to:
acquire the manufacture facility information from the first memory,
automatically set coordinate information of the manufacture facility on the arrangement map based on the position information included in the manufacture facility information, and set communication setting information required for communication with the controller based on the identification information included in the manufacture facility information,
acquire the operation information of the manufacture facility by making communication with the controller by use of the set communication setting information, and
cause the display to display the acquired operation information of the manufacture facility on the arrangement map based on the coordinate information, so as to intensively manage an operation situation of the manufacture facility,
the first memory is provided in the controller, and
the controller is further configured to:
store the identification information uniquely specifying the manufacture facility,
acquire position information of the controller, and associate the identification information with the position information of the controller, and
store the associated identification information and position information of the controller in the first memory.

2. An operation management system, comprising:
at least one manufacture facility, which includes one of a machine tool, a robot and an industrial machine, the manufacture facility comprising a controller;
a management device including a display and a first processor, the first processor being configured to arrange and cause the display to display operation information of the at least one manufacture facility on an arrangement map indicating an outline of a plant where the manufacture facility is installed; and
a first memory configured to store manufacture facility information in which identification information uniquely specifying the manufacture facility is associated with position information specifying a position of the manufacture facility,
wherein the first processor of the management device is further configured to:
acquire the manufacture facility information from the first memory,
automatically set coordinate information of the manufacture facility on the arrangement map based on the position information included in the manufacture facility information, and set communication setting information required for communication with the controller based on the identification information included in the manufacture facility information,
acquire the operation information of the manufacture facility by making communication with the controller by use of the set communication setting information, and
cause the display to display the acquired operation information of the manufacture facility on the arrangement map based on the coordinate information, so as to intensively manage an operation situation of the manufacture facility,
the first memory is provided in the terminal device,
the controller comprises a second processor configured to output the identification information uniquely specifying the manufacture facility,
the terminal device includes a third processor configured to:
acquire the identification information output by the controller,
acquire position information of the terminal device when the identification information is acquired, associate the identification information with the position information of the terminal device, and store the associated identification information and position information of the terminal device in the first memory.

3. The operation management system according to claim 1, wherein the management device further comprises a second memory configured to store the identification information of the manufacture facility, the first processor of the management device is configured to acquire the identification information of the manufacture facility stored in the second memory, and the identification information of the manufacture facility is information by which the management device uniquely identifies the manufacture facility.

4. The operation management system according to claim 2, wherein the terminal device is connected to the management device via a network.

* * * * *